Jan. 25, 1927.
C. C. GOODRICH
1,615,376
SPRING EQUALIZER
Filed April 17, 1924
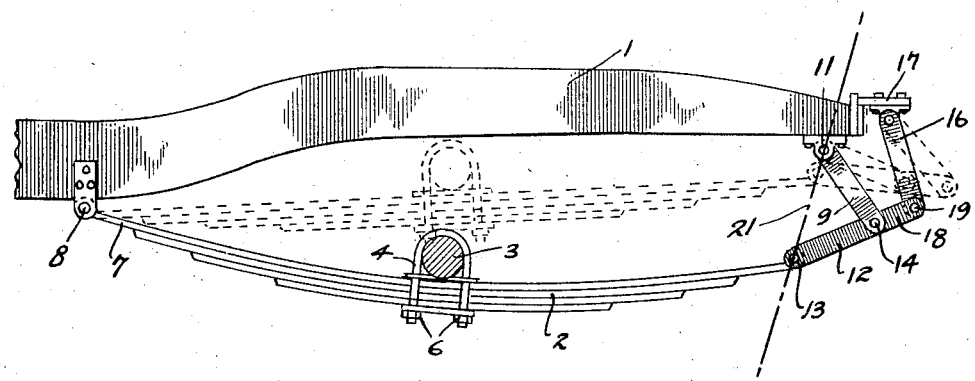
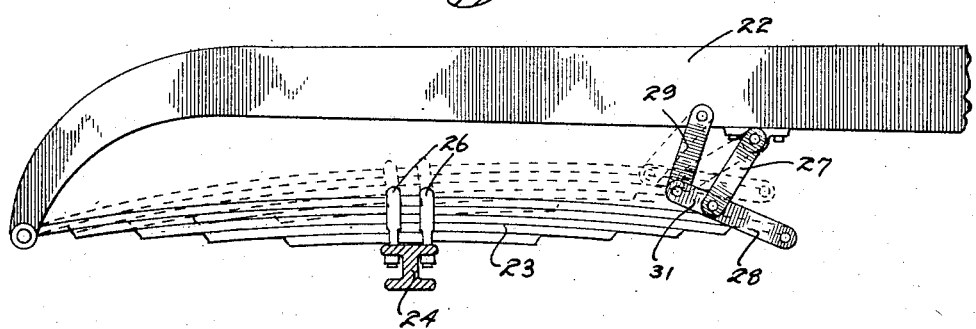
Inventor
Coy C. Goodrich
By
Attorneys.

Patented Jan. 25, 1927.

1,615,376

UNITED STATES PATENT OFFICE.

COY C. GOODRICH, OF CHARLOTTE, MICHIGAN.

SPRING EQUALIZER.

Application filed April 17, 1924. Serial No. 707,214.

The present invention relates to improvements in spring equalizers and is particularly designed to be used in connection with the springs of a motor vehicle, although it may be useful in other connections. The principal object of the invention is to provide instead of the spring shackle now commonly used as a connection between the spring and the vehicle chassis a link mechanism which not only allows the spring to contract and expand but also allows the end of the spring to move toward or away from the chassis when the spring is contracted or expanded respectively.

As used at the present time the spring absorbs a certain portion of a shock received by passing over an obstacle in the road, but that part of the shock that is transmitted to the spring ends affects the chassis and the vehicle body with undiminished force, and it is proposed in the present invention to suspend the spring end in such a manner that it is allowed to yield toward the body and thereby again absorbs a considerable portion of the shock and practically causes the body to float along without being affected to any extent by ordinary shocks received by the vehicle wheels. Further objects and advantages of my device will appear as the specification proceeds.

The preferred form of my invention is illustrated in the accompanying drawing, in which Figure 1 shows my spring equalizer in connection with a semi-elliptical vehicle spring curved upwardly, and Figure 2 the same mechanism as applied to a semi-elliptical spring curved downwardly, the difference in the two situations being that the spring shown in Figure 1 expands when a shock is received, while the spring shown in Figure 2 contracts under the same circumstances. While I have shown only the preferred form of the invention, I wish to have it understood that various changes or modifications may be made within the scope of the claims hereto attached without departing from the spirit of the invention.

Referring first to Figure 1: Of the frame (1) only the rear portion is shown, which portion is supported by means of a semi-elliptical spring (2) secured to the rear axle housing (3) by means of the clamp (4) and nuts (6). It is assumed for the purpose of the present description that the axle housing (3) is free to move relative to the body of the vehicle.

One end (7) of the spring is pivotally secured to the frame as shown at (8). Where the axle housing or the axle supporting frame is prevented from moving relative to the body by means of a radius rod, for instance, an ordinary shackle or my lever arrangement (to be described presently) should be substituted for the pivot (8).

My spring equalizer or lever arrangement as shown in Figure 1 comprises a link (9) pivoted to the frame as shown at (11), a second link (12) pivoted to the end of the spring as shown at (13), a pivot connection (14) between the two links, and a third link (16) pivoted to the frame or to a bracket (17) extending from the frame and engaging with its free end an extension (18) of the link (12) as shown at (19).

The action of this link mechanism may be explained as follows:

When the center of the spring receives a shock through the axle housing, the spring expands and tends to straighten out. In expanding, the spring throws the link (12) rearwardly and thereby causes the pivot (13) through the action of the two links (9) and (16) to move upwardly toward the frame substantially along the dotted line (21).

As the spring contracts after the shock has been absorbed, the pivot (13) recedes from the body along the same line on which it advanced toward the body. The links (9) and (12) thus form an angle of constantly changing magnitude, the angle being increased and decreased as the spring expands and contracts, and the link (16) not only preventing the collapse of the two links (9) and (12) but also cooperating in opening the angle between the two links (9) and (12) as the spring contracts.

It will be seen that my link mechanism may be used in connection with any motor vehicle spring, may be used at one end or at the other end, and may be used in connection with a cantilever spring as well as with a semi-elliptical spring.

In the form shown in Figure 2, the front end (22) of the frame is shown with a spring (23) secured to the axle (24) by means of clamps (26). This spring, as contra-distinguished from the spring shown in Figure 1, contracts when receiving a shock, and the lever mechanism is arranged so that the angle between the two links (27) and (28) decreases as the spring (23) contracts, while the link (29) guides the rear extension (31) of the link (28) for forcing the angle between the two links (27) and (28) to open when the spring expands. The action of the link mechanism is exactly the same as that of the link mechanism shown in Figure 1.

I claim:

1. In combination with a vehicle spring, a link pivoted to a spring end, a second link pivoted to the supported element, a pivotal connection between the two links, an extension of the first link beyond the pivotal connection and a third link pivotally connecting the extension with the supported element, all of said links being interposed between the supported element and said spring end.

2. In combination with a vehicle spring, a link pivoted to a spring end, a second link pivoted to the supported element, a pivotal connection between the two links allowing the spring end to move toward and to recede from the supported element, and means causing the angle between the two links to open when the spring end tends to recede, said links and said means all interposed between the spring end and the supported element.

3. In combination with a vehicle spring, a link pivoted to a spring end, a second link pivoted to the supported element, a pivotal connection between the two links allowing the spring end to move toward and to recede from the supported element, and a third link engaging an extension of the first link for parting the latter from the second link when the spring end tends to recede, all of said links interposed between the spring end and the supported element.

COY C. GOODRICH.